United States Patent [19]
Goodwin

[11] 3,815,768
[45] June 11, 1974

[54] PANEL TRAILER

[76] Inventor: Wayne M. Goodwin, 2813 Lombardy La., Dallas, Tex. 75220

[22] Filed: Jan. 3, 1972

[21] Appl. No.: 214,708

[52] U.S. Cl.................. 214/390, 280/34 A, 280/42
[51] Int. Cl............................................. B60p 3/00
[58] Field of Search .......... 214/390, 392, 394, 396, 214/505, 506; 280/43.11, 34 R, 34 A, 42

[56] References Cited
UNITED STATES PATENTS

| | | | |
|---|---|---|---|
| 1,261,428 | 4/1918 | Norman | 214/390 |
| 2,547,269 | 4/1951 | Kinsey | 214/390 |
| 3,103,371 | 9/1963 | Young | 280/414 R |
| 3,346,131 | 10/1967 | Lundell | 214/506 |
| 3,529,736 | 9/1970 | Lebre | 214/390 |
| 3,572,743 | 3/1971 | Parr | 214/390 |

*Primary Examiner*—Albert J. Makay
*Attorney, Agent, or Firm*—Howard E. Moore; Gerald G. Crutsinger

[57] ABSTRACT

A trailer for hauling wall panels, containers, palletized loads or the like comprising a transverse expandable front member with side members pivotally attached at opposite ends thereof and guide members pivotally attached at the rear ends of the side members. The guide members are mounted on wheels and a closure member is pivotally attached to the rear end of one of the guide members and disengageably attached at the other end to the outer end of the other guide members. Hydraulically actuated means is employed to pivot the guide means relative to the side members to move rear ends of the side members outwardly to deposit the rear end of a load and the front member may then be expanded to disengage the front end of the load. An end of the closure member may then be disengaged permitting movement of the trailer away from the deposited load.

11 Claims, 11 Drawing Figures

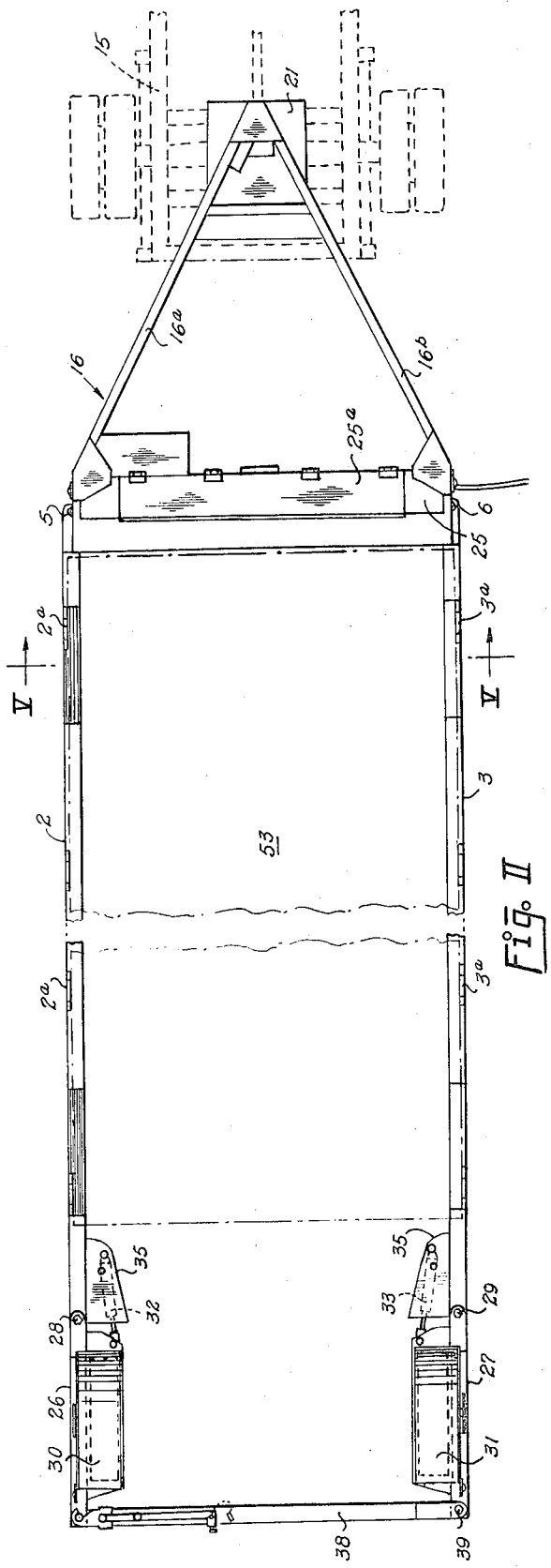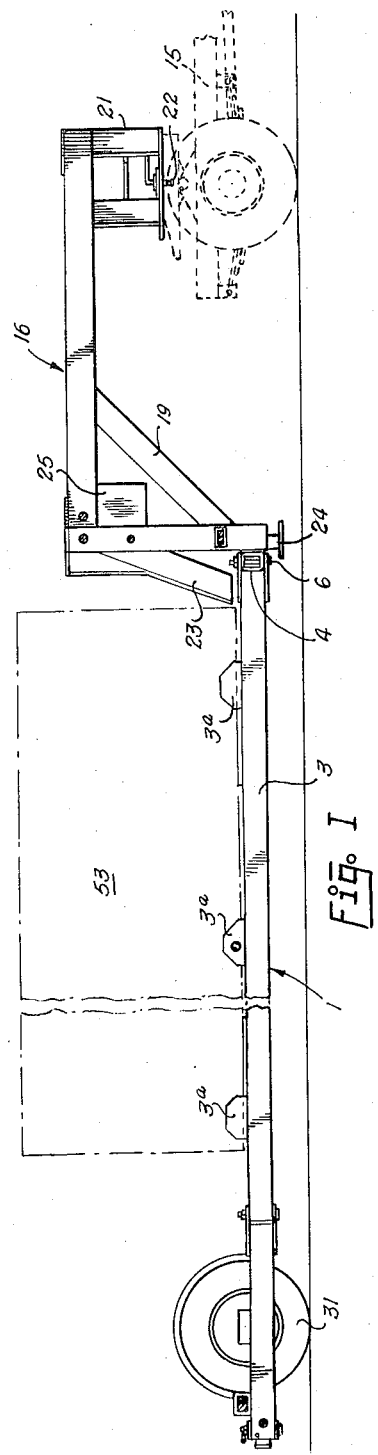

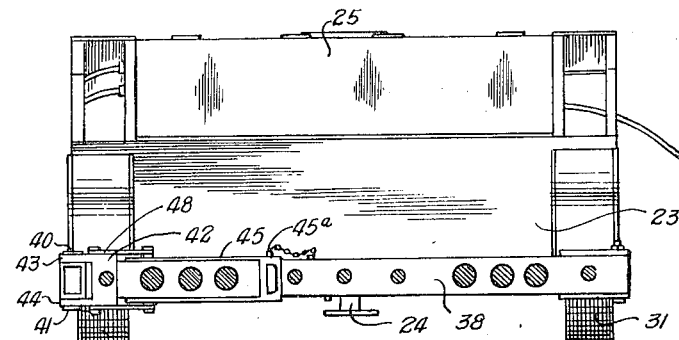
Fig. III
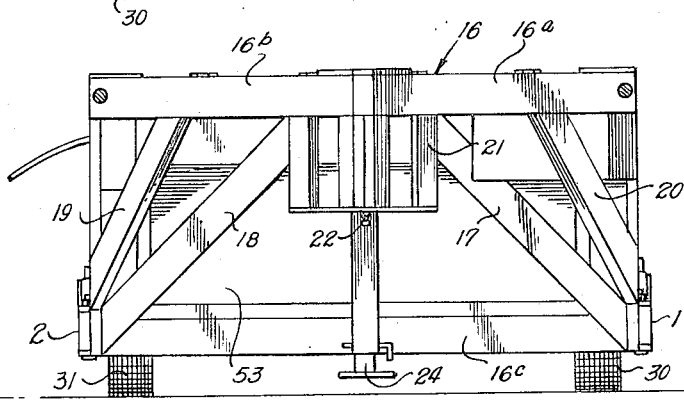
Fig. IV
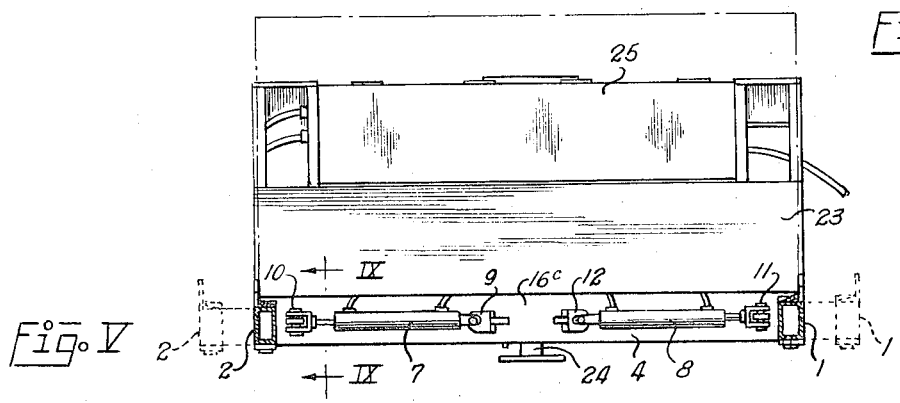
Fig. V
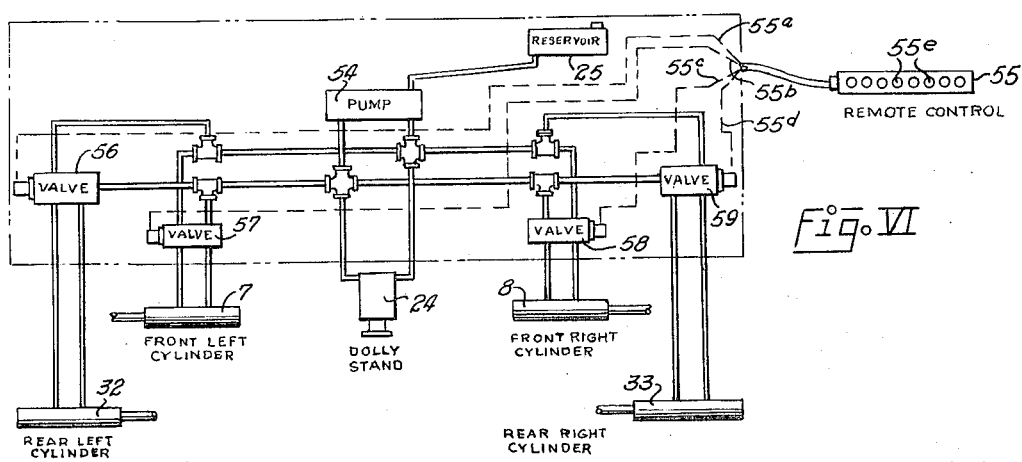
Fig. VI

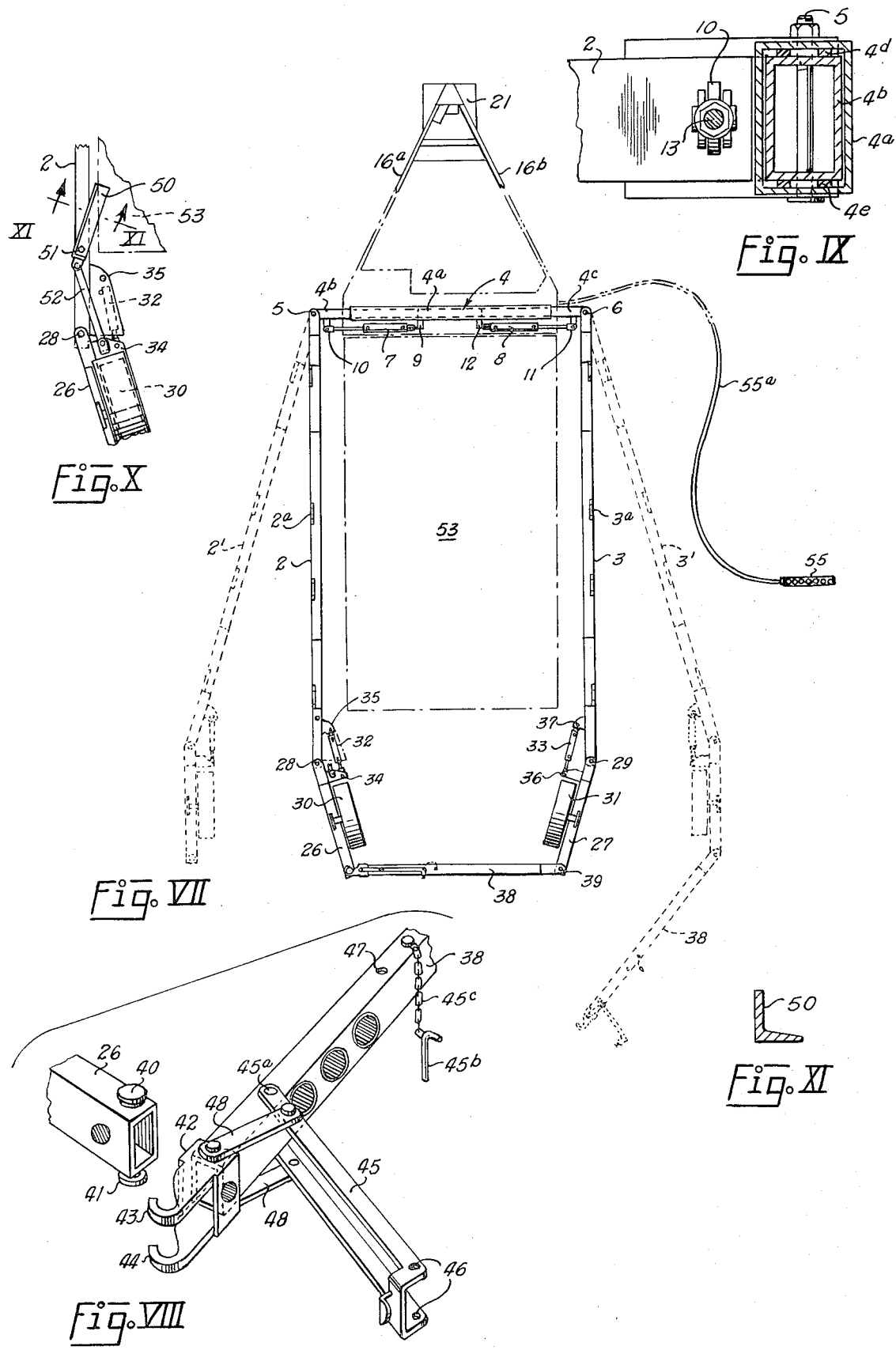

PANEL TRAILER

BACKGROUND OF THE INVENTION

It is customary in the construction industry to cut and prefabricate wall panels and the like at a central point and transport same to the job site. Heretofore the handling, loading and transporting of such prefabricated wall panels has not been satisfactory because it was either necessary to individually load and unload same, requiring excessive amount of labor and handling, or if bundled it was necessary to lift same to the bed of a conventional trailer by a hoist, and in order to prevent damage thereto it was necessary to individually unload the panels at the job site or to employ a hoist for removing a bundle thereof from the trailer bed. Often in handling same by such means they were dropped and damaged to an extent that same were unusable.

SUMMARY OF THE INVENTION

The invention hereinafter described provides means for handling, loading, transporting, and unloading wall panels or the like in a simpler, more expeditious, economical manner without the danger of damage thereto.

Therefore, among the objects of the invention are the following:

The provision of a trailer for hauling prefabricated wall panels or the like wherein a bundle of wall panels may be quickly and easily loaded and quickly and easily unloaded without the danger of damage thereto.

The provision of a low slung trailer frame on which bundles of panels may be loaded and supported by the side frames thereof wherein the side frames may be expanded out of engagement with the panels for depositing same on the ground for unloading.

The provision of low slung trailer frame for hauling bundles of panels wherein the panels may be easily deposited thereon and which may be unloaded by expanding the side frames thereof to deposit the load on the ground.

The provision of guide members at the rear of the side members of the trailer frame which may be positioned to cause the side members to pivot and move outwardly while being expanded to deposit the load on the ground to thereby free the side members from the load.

The provision of expandable pivotally mounted side members on a trailer frame which may be disengageably attached together at the outer end so that they may be expanded to disengage a load therefrom and subsequently disconnected permitting movement of the trailer from the load which has been deposited upon the ground or other surface.

The provision of means on a trailer frame of the type indicated with the addition of means actuated by the guide member to initially urge the side members outwardly to disengage at least one end of a load prior to moving the trailer frame forwardly to cause the side members to pivot outwardly out of engagement with the other end of the load being deposited therefrom.

A general object of the invention is to provide a simple, efficient, economical apparatus for loading, transporting and unloading prefabricated wall panels without damage thereto.

The trailer includes a low slung frame which may be detachably attached to a towing vehicle. The frame is generally rectangular in shape and open between the side and end members. The front transverse frame member is comprised of a tubular central member with slidably disposed members telescoped therein. The telescoped members are pivotally mounted to the parallel side frames and hydraulic cylinders attached between the tubular member and the telescoped members so that the side members may be expanded outwardly. Wheel mounted guide members are pivotally attached to the rear of the side members and are disengageably attached together by a transverse gate member which is pivoted at one end to one of the guide members and is disengageably attached at the other end. Hydraulic means is provided between the guide members and the side frames such that prior to disengagement of the gate member, the guide members may be pivoted out of alignment with the side members so that upon moving the trailer forwardly the wheels are turned angularly outwardly to thereby cause the side members to move outwardly to prevent engagement with the load which has been previously deposited upon the ground by outward expansion of the rear ends and the front ends of the side members. A bundle of prefabricated panels, or the like, may be deposited upon the side members by a forklift truck or other loading device for transportation to the job site. The panels may be quickly and easily unloaded at the job site by simply expanding the side members outwardly from underneath the panels, allowing them to be gently deposited upon the ground. Upon unlatching the gate member, the guide members being angularly disposed relative to the side members, the trailer may be moved forwardly to cause the side members to move outwardly preventing engagement with the load.

DESCRIPTION OF THE DRAWINGS

FIG. I is a side elevational view of the panel hauling trailer;

FIG. II is a top plan view thereof;

FIG. III is a rear end view thereof;

FIG. IV is a front end view thereof;

FIG. V is a transverse sectional view taken along the line V—V of FIG. II;

FIG. VI is a schematic view of the hydraulic system employed for actuation of the device;

FIG. VII is a top plan view showing in broken lines the side members expanded and pivoted outwardly as they would appear in unloading the device;

FIG. VIII is an enlarged fragmentary perspective view of the latching means for disengageably attaching the rear frame member to the outer end of one of the extension members;

FIG. IX is a transverse sectional view taken along the line IX—IX of FIG. V;

FIG. X is a top plan view of a modified form of the device showing means for positively disengaging the side members from the panels upon actuation of the extension guide members; and FIG. XI is a cross-section view of the pusher arm.

DESCRIPTION OF A PREFERRED EMBODIMENT

Numeral references are employed to indicate the various parts shown in the drawings and like numerals indicate like parts throughout the various figures of the drawings.

The numeral 1 generally indicates a generally rectangularly shaped trailer frame which is low slung and includes parallel side members 2 and 3 which are attached together at their forward ends by a transverse front frame member 4 which is comprised of a tubular member 4a in the ends of which are slidably disposed telescoping members 4b and 4c. Members 4b and 4c are slidably disposed upon glides 4d and 4e inside tubular member 4a (FIG. IX). The forward ends of the side members 2 and 3 are pivotally mounted at 5 and 6 to the outer ends of the telescoping members 4b and 4c.

Double acting hydraulic cylinders 7 and 8 are pivotally attached between the brackets 9 and 10 and 11 and 12, respectively, which are secured to the tubular member 4a and to the telescoping members 4b and 4c, respectively. It will be seen that by expanding the hydraulic cylinders 7 and 8 the telescoping members 4b and 4c may be slidably moved outwardly, carrying with them the side frame members 2 and 3.

A dolly 16 having a forwardly extending hitch portion thereon formed by the converging arms 16a and 16b is reinforced and supported by brace members 17, 18, 19 and 20, and has a transverse member 16c across the lower rear end thereof which is fixedly attached as by welding to the tubular member 4a of the transverse frame member 4. A connection frame 21 extends downwardly from the forwardly extending portion 16 of the dolly which has a king pin 22 thereon which may be pivotally attached to the bolster of a towing vehicle 15, whereby the trailer device may be towed behind the towing vehicle in conventional manner.

A deflector plate 23 is attached transversely of the dolly 16 to protect the load against rocks and dirt propelled by the wheels of the towing vehicle.

A stand 24 is suspended below the dolly 16 to support the trailer when not connected to the towing vehicle.

A hydraulic fluid reservoir 25 is secured transversely of the dolly to supply hydraulic fluid for actuation of the hydraulic cylinders as hereinafter described. A hinged access cover 25a is positioned above the reservoir 25 to close and protect same.

Hinged frame extension steering members 26 and 27 are pivotally attached at 28 and 29 to the rear ends of the side frames 2 and 3.

Transporting wheels 30 and 31 are appropriately mounted on the hinged extensions 26 and 27 for the purposes hereinafter mentioned.

Double acting hydraulic cylinders 32 and 33 are pivotallly attached between plates 35 and 37 secured to the side members 2 and 3 and the lugs 34 and 36 secured to the extension members 26 and 27.

A rear frame member 38 is pivotally attached at 39 to the extension member 27 and is detachably attached at the other end to the rear end of the extension member 26 by means of a disengageable latching assembly associated with the end thereof. Locking lugs 40 and 41 are attached to opposite sides of the extension member 26 which are arranged to receive the hooks 43 and 44 extending outwardly from a sleeve 42 slidably disposed on the end gate member 38. A bifurcated actuating arm 45 straddles the gate 38 and is pivotally attached thereto at 45a. The toggle links 48 are pivotally attached between the actuating arm 45 and the sleeve 42. It will be seen that the arm 45 may be pivoted toward the gate member 38 to move the sleeve 42 inwardly therealong through the toggle links 48 to exert tension thereon after the hooks 43 and 44 have been passed about the locking lugs 40 and 41 to thereby disengageably latch the gate 38 to the extension member 26. The arm 45 may be latched to the gate member 38 by passing the pin 45b through aligned holes 46 in the end of the locking arm 45 and a hole 47 provided through the gate member 38. The locking pin 45b is suspended to the gate member 38 by a chain 45c.

In the modified form shown in FIG. X the angle-shaped member 50 is pivotally attached at 51 to the side member 2 or 3, and the end thereof is pivotally connected through a link 52 to the mounting lug 34 for the cylinder 32. When the cylinder 32 is contracted to move the extension member 26 inwardly the pusher arm 50 is rotated clockwise through the link 52 to engage the panels 53, carried on the side members 2 and 3 to tend to push them therefrom to disengage the side members 2 and 3 from the panels to allow them to be deposited upon the ground or other surface where the panels are being unloaded.

The hydraulic system for operating the cylinders hereinbefore described is shown in FIG. VI and includes a pump 54 and a remote control switch device 55 of conventional construction. The remote control switching device 55 has batteries therein, which through appropriate electric leads 55a–55d actuate the solenoid valves 56–59 to apply hydraulic pressure to the hydraulic cylinders in appropriate direction to move the members with which they are associated as herein described. It will be noted that the remote control device 55 has sufficient pressure switches 55e thereon to control both directions of movement of the hydraulic cylinders so that they can be extended or retracted for movement of the members controlled thereby in both directions.

OPERATION AND FUNCTION

The trailer is attached to the towing vehicle 15 as shown in FIG. I in which the extension members 26 and 27 are aligned with the side members 2 and 3, and the rear gate 38 is latched to the outer end of the extension member 26 to retain same in such position.

A bale of panel members 53 is loaded on the trailer by a forklift truck or other means so that they rest on the upper surfaces of the side members 2 and 3 and are held against lateral movement by the lugs 2a and 3a attached to, and upwardly extending, from the outer edges of the side members 2 and 3.

After the load has been transported to the job site or other place where it is to be unloaded same may be quickly and easily unloaded and deposited upon the ground or other surface by the following procedure: The appropriate switches on control 55 are actuated to contract the hydraulic cylinders 32 and 33, to thereby move the pivot pins 28 and 29 securing side members 2 and 3 to extension steering members 26 and 27 outwardly, moving members 26 and 27 into an angular relationship to the side members 2 and 3, as the rear ends of side members 2 and 3 move outwardly from beneath the load, as shown in FIG. VII, at which time the arm 50 may engage and push the panels 53 from the side members 2 or 3 in the event such is needed. In such position the wheels 30 and 31 are directed angularly outwardly and the rear end of load 53 is resting upon the ground. By actuating the appropriate switches on the remote control device 55 the hydraulic cylinders 7 and 8 are expanded to move the front ends of side members 2 and 3 outwardly out of supporting engagement with the front end of the load such as panels 53. The pin 45b may then be removed from the holes 46 and 47 and the actuating arm 45 rotated rearwardly to move the sleeve 42 outwardly and disengage the hooks 43 and 44 from the pins 40 and 41. The towing vehicle is then moved forwardly which causes the angularly turned transporting and guide wheels 30 and 31 to move the rear ends of side members 2 and 3 outwardly preventing engagement with the deposited load 53 as the vehicle is moved forwardly shown in broken lines at 2' and 3' of FIG. VII. After the side members 2 and 3 and the gate member 38 have cleared the load 53 the trailer may be again closed to the position shown in FIG. II by actuation of the appropriate switches on the remote control 55 to retract the hydraulic cylinders 7 and 8 and expand the hydraulic cylinders 32 and 33 to thereby move the side members 2 and 3 into retracted position and to move the extension members 26 and 27 into alignment with the side members 2 and 3. The hooks 43 and 44 may then be re-engaged with the pins 40 and 41 and the arm 45 moved inwardly to locking position, to thereby lock the end gate member 38 into locked position between the ends of the extension members 26 and 27, at which position the trailer is again in transportable condition.

It will thus be seen that I have provided a trailer apparatus for hauling prefabricated panels or the like on which the panels may be easily loaded in bundles and which may be quickly and easily unloaded by expanding the side frames of the trailer member, and causing the transporting wheels to be turned angularly outwardly so that when the trailer is moved forwardly the side members will move past the load, after same has been gently deposited on the ground or other surface without damage thereto.

It will be understood that other and further embodiments of the invention may be devised without departing from the spirit and scope of the appended claims.

Having described my invention I claim:

1. A trailer comprising, a transversely extending front frame member; means to secure the front frame member to a prime mover; first and second side frame members pivotally attached to the outer ends of said front frame; extension members pivotally attached to the outer end of each side frame member; a wheel carried by each extension member; a rear frame member pivotally attached to the outer end of one of said extension members; detachable attachment means between the other end of said rear frame member and the outer end of the other extension member; and expansible and retractable means between each of said extension members and the side frame member to which it is attached, whereby the extension members may be pivoted out of alignment with the side frame members to cause the wheels carried thereby to be directed angularly outwardly.

2. The combination called for in claim 1 wherein the expansible and retractable members are double acting hydraulic cylinders.

3. The combination called for in claim 1 wherein the front frame member is comprised of at least two slidably related members with the addition of means to move the slidably related members relative to each other.

4. The combination called for in claim 1 wherein the front frame member is comprised of a central tubular member and an outer member at each end thereof slidably disposed therein, each of said end members being pivotally attached at its outer end to the side frame members; and with the addition of means to move the outer members relative to the central member.

5. The combination called for in claim 1 wherein the means for detachably securing the end of the rear frame member to the extension member comprises a sleeve slidably disposed on the outer end of the rear frame member, lugs on the end of the extension member, hooks on the sleeve engageable with the lugs, an actuating arm, and toggle links between the sleeve and the arm arranged to move the hook members into engagement with the lugs when the arm is pivoted inwardly to extend the links and move the sleeve inwardly along the rear frame member.

6. The combination called for in claim 1 with the addition of a pusher arm pivotally attached to the upper side of the side frame member, and a link pivotally attached between the arm and the extension member to cause the pusher arm to pivot inwardly into engagement with a load on the trailer when the extension member is moved by retraction of the expansible and retractable member between the side member and the extension member.

7. A trailer comprising an expandable transversely extending front frame member; means to expand the front frame member; first and second side frame members pivotally attached to the outer ends of the front frame member; wheel support means pivotally secured to the outer ends of each side frame member, said wheel support means being movable about vertical axes; at least one wheel on each wheel support means; steering means to control the line of travel of said wheels, said steering means being adapted to move the wheel secured to the first side frame member in a clockwise direction about a vertical axis and to move the wheel secured to the second frame member in a counter-clockwise direction about a vertical axis; a rear frame member secured to one of the side frame members; and means to detachably secure said rear frame member to the outer end of the other said side frame member.

8. The combination called for in claim 7 wherein the end of the rear frame member opposite the detachable means is pivotally attached to the side frame member.

9. The combination called for in claim 7 wherein the wheel support means are extensions pivotally attached to the outer ends of side frame members; and the steering means are hydraulic cylinders pivotally attached between the extensions and the side frame members.

10. The combination called for in claim 7 with the addition of load retaining means extending upwardly from the outer edge of each side frame member to prevent a load disposed on the side frames from moving sidewise.

11. A trailer comprising an expandable transversely extending front frame member; means to expand the front frame member; first and second side frame members pivotally attached to the outer ends of the front frame member; a pusher arm pivotally attached to each side frame member; extension means pivotally attached to the outer ends of each of said side frame members; a hydraulic cylinder pivotally attached between each of said extension means and the side frame members to control the line of travel of said wheels; actuating means between each said pusher arm and said hydraulic cylinder associated with the extension to pivot the arm inwardly of the side frame member; a rear frame member secured to one of the side frame members; and means to detachably secure said side frame member to the outer end of the other said side frame member.

* * * * *